(No Model.)  2 Sheets—Sheet 1.

G. G. WESTERFIELD.
MACHINE FOR GATHERING CORN.

No. 351,302. Patented Oct. 19, 1886.

WITNESSES
F. L. Ourand
Edward Stanton

INVENTOR
Granville G. Westerfield,
By Louis Bagger & Co.
Attorneys.

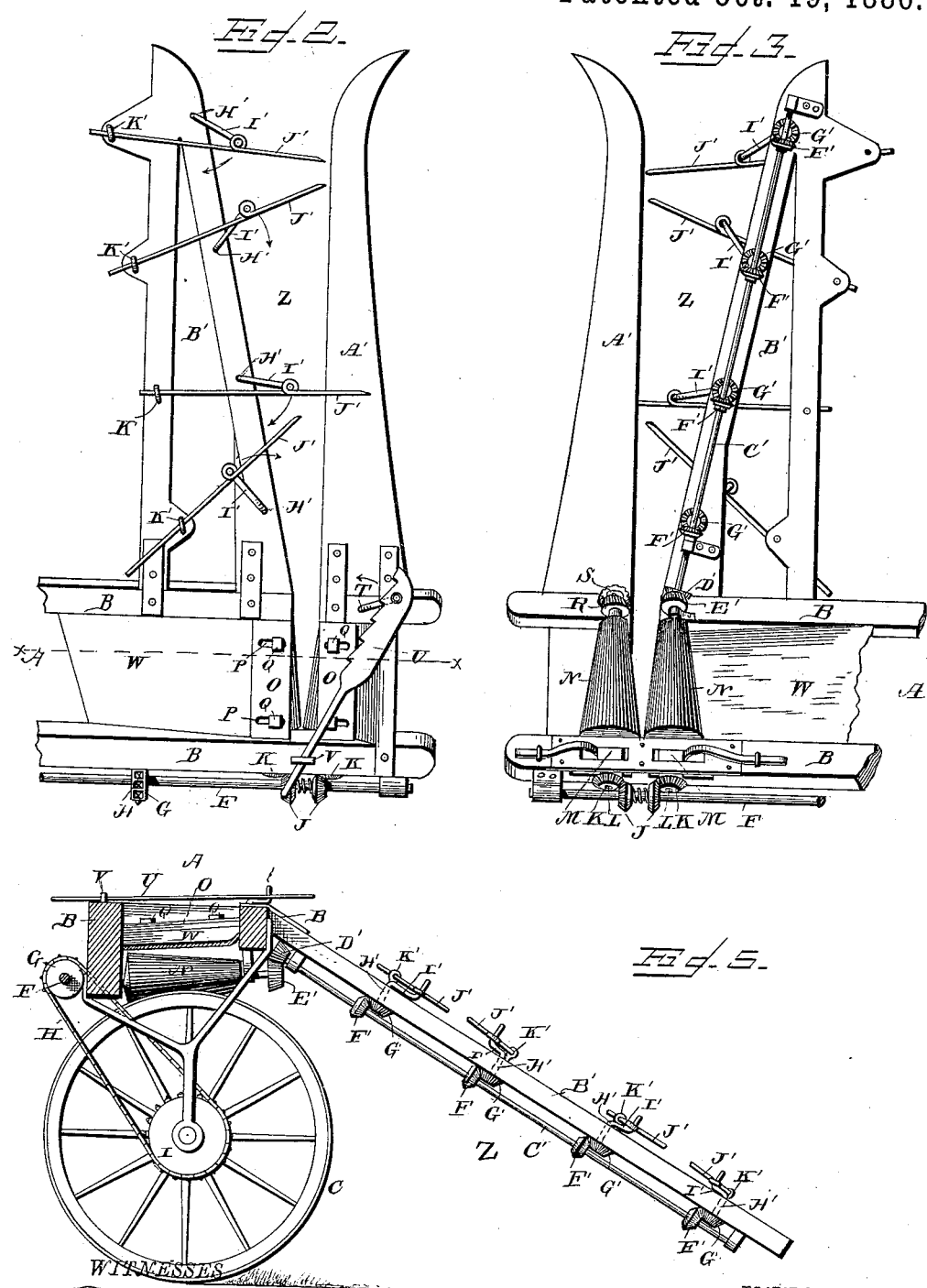

UNITED STATES PATENT OFFICE.

GRANVILLE G. WESTERFIELD, OF SHELBYVILLE, INDIANA.

MACHINE FOR GATHERING CORN.

SPECIFICATION forming part of Letters Patent No. 351,302, dated October 19, 1886.

Application filed December 10, 1885. Serial No. 185,240. (No model.)

*To all whom it may concern:*

Be it known that I, GRANVILLE G. WESTERFIELD, a citizen of the United States, and a resident of Shelbyville, in the county of Shelby and State of Indiana, have invented certain new and useful Improvements in Machines for Gathering Corn; and I do hereby declare that the following is a full, clear, and exact description of the invention, which will enable others skilled in the art to which it appertains to make and use the same, reference being had to the accompanying drawings, which form a part of this specification, and in which—

Figure 1:
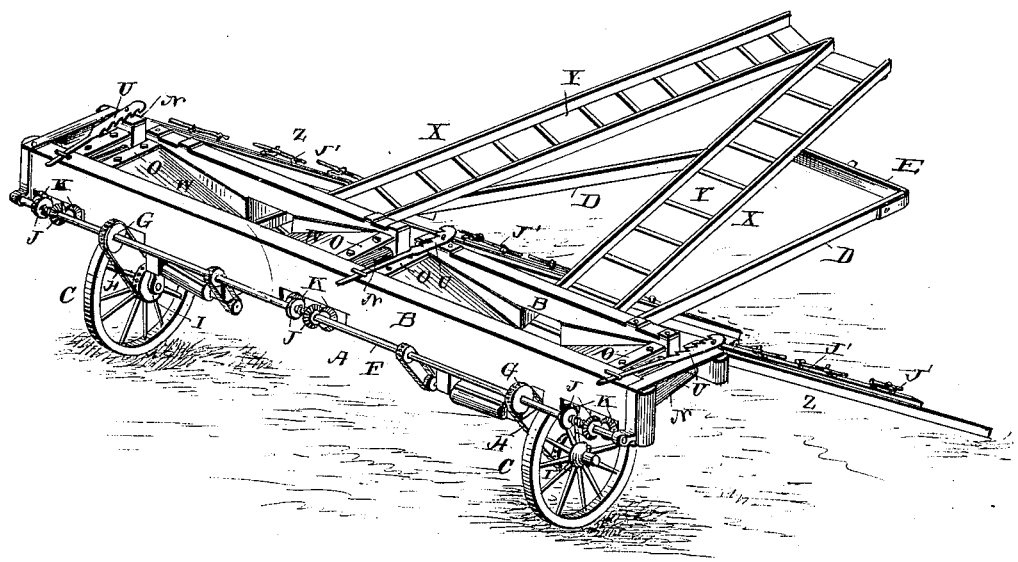
Figure 4:
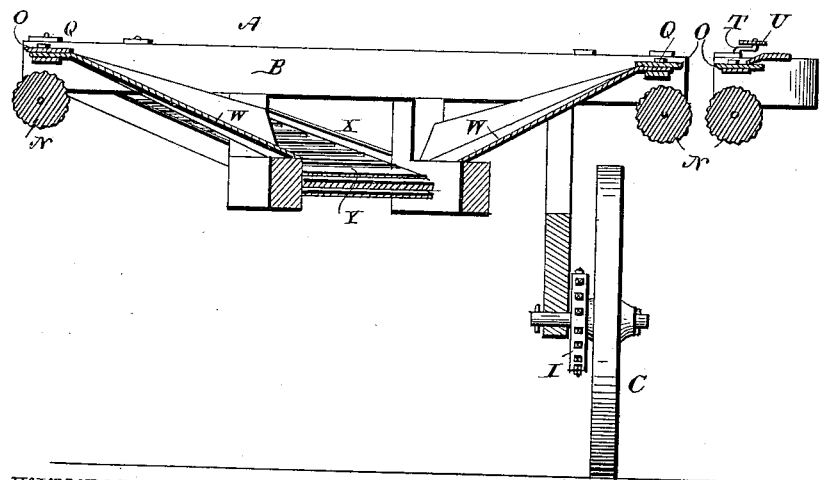

Figure 1 is a perspective view of my improved device for gathering corn. Fig. 2 is a top view of one of the gathering devices. Fig. 3 is a bottom view of the same. Fig. 4 is a vertical sectional view on line $x\ x$, Fig. 2; and Fig. 5 is a vertical section taken inside of one of the drive-wheels, looking toward the wheel.

Similar letters of reference indicate corresponding parts in all the figures.

My invention has relation to machines for gathering the ears from the stalks of corn; and it consists in the improved construction and combination of parts of such a machine which will draw the stalks of corn up toward stripper rollers and blades which will strip the ears from the stalks and carry them from the gatherer into a wagon or other moving receptacle, the machine being attached to the rear end of a wagon and stripping the ears from several rows of stalks at the same time, as hereinafter more fully described and claimed.

In the accompanying drawings, the letter A indicates a long frame, consisting, mainly, of two sills, B B, suitably connected parallel to each other and mounted upon wheels C C, one at each end of the frame and underneath the same. Two bars or arms, D D, are secured to the frame, and are connected at their forward ends by means of a yoke, E, which is secured to the bed of a wagon, so that the machine may be dragged behind the wagon. A shaft, F, is journaled in bearings upon the rear side of the frame, and is provided with sprocket-wheels G, over which pass sprocket-chains H, which pass over sprocket-wheels I upon the hubs of the drive-wheels, and the shaft is provided at suitable intervals, of the same distance as between the rows of corn, with bevel-gears J, which mesh with bevel-gears K upon short shafts L, journaled transversely of the shaft F in pairs under the sills of the frame in yielding bearings M. These shafts are provided with forwardly-tapering corrugated rollers N, which, by the downward revolution of their adjacent sides when the machine is propelled, will draw the stalks downward between the adjustable stripper-plates O, to strip the ears from the stalks. These stripper-plates are provided with slots P, with which they slide upon bolts Q, so that the plates may be adjusted closer to each other or farther apart, according to the size of the stalks to be stripped, the yielding rollers likewise serving to adapt the machine to operate on stalks of different thickness.

The forward end of one of each pair of roller shafts is provided with a bevel-gear, R, which meshes with a similar gear, S, upon the lower end of a crank-shaft, T, journaled in a vertical bearing in the forward sill, near the aperture in the same, through which the stalks pass, and a serrated bar, U, is pivoted at its forward end to the crank upon this shaft and slides with its rear end in a suitable staple, V, upon the rear sill, so that the serrated edge of the bar will be brought to bear against the ears of corn and assist in tearing them from the stalk.

Inclined chutes W extend from the adjustable stripper-plates to the conveyers X, which converge so as to bring their forward ends into the wagon-box, conveying the ears into the same, and the bottoms of these conveyers are preferably provided with endless aprons Y, which assist in conveying the ears to the box.

Lifters or guides Z are secured in pairs to the forward sill of the frame, projecting forward and downward in an inclined position, one pair at each pair of rollers, and these guides consist each of an arm, A', having its lower end curved slightly to the side, and a similarly-shaped arm or bracket, B', having its lower end curved to the other side, so that the lower ends of the arms diverge. The arm or bracket B' of each pair of guides has a shaft, C', journaled in bearings upon the under side of its inner edge, and this shaft is provided at its upper end with a bevel-gear, D', which meshes with a similar gear, E', upon the forward end of one of the roller-shafts, and this shaft is provided at intervals with bevel-gears F', which mesh with similar gears, G', upon the lower ends of crank-shafts H', journaled in bearings near the inner edge of the guide-arm. The cranks I' of these crank-shafts have arms J' pivoted to them, and the rear ends of these arms or bars slide in pivoted eyes K', pivoted at the outer edge of the guide-arm, and when the shaft upon the under side of the guide-arm is revolved by the machine being propelled the bars will have their inner ends rocked from below upward, forcing the stalks up between the guide-arms and into the spaces between the stripper rollers and plates, which will strip the ears from the stalks.

It will thus be seen that when the wagon is propelled over the field, following the rows so that each pair of guide-arms will straddle a row of stalks, the lifting-bars upon the guide-arms will draw the stalks in an upright position to the strippers, where the rollers will draw the stalks downward, so that the stripper-plates and the serrated arms may strip the ears from the stalks, and the ears as they are stripped from the stalks will roll down the inclined chutes to the conveyers, which will carry the ears forward into the wagon-box.

It will be seen that the forwardly-projecting inclined guide brackets or arms will embrace the rows of corn, and the lifting-bars will serve to raise the broken or bent stalks, and will keep them upright, so that the rollers will clasp the stalk below the ears, the machine being sufficiently low to present the strippers below the ears upon average-sized corn, so as to prevent the machine from skipping any stalks.

Having thus described my invention, I claim and desire to secure by Letters Patent of the United States—

1. In a machine for gathering ears of corn from the stalks, the combination of a pair of forwardly-tapering rollers, means for imparting revolving motion to the same, a pair of adjustable stripper-plates above the rollers, a crank-shaft having a gear meshing with a gear upon one of the rollers and journaled vertically at one side of the aperture, between the plates, and an arm having a serrated edge and pivoted at one end to the crank, and sliding with its other end in a bearing, as and for the purpose shown and set forth.

2. In a machine for gathering corn from the stalks, the combination, with a pair of forwardly and downwardly inclined guide-brackets, rollers, and means for operating them, a shaft journaled upon the under side of the inner edge of one of the brackets and having bevel-gears at intervals, shafts journaled in bearings near the inner edge of the bracket, and having bevel-gears at their lower ends and cranks at their upper ends, said gears meshing with the gears upon the shaft, eyes pivoted at the outer edge of the bracket, and bars pivoted to the cranks and sliding in the pivoted eyes, as and for the purpose shown and set forth.

3. In a machine for gathering corn from the stalks, the combination of a pair of forwardly and downwardly inclined guide-brackets, cranks journaled at the inner edge of one arm, eyes pivoted at the outer edge of the said arm, bars pivoted to the cranks and sliding in the eyes, means for revolving the cranks, forwardly-tapering corrugated rollers journaled in pairs at the upper ends of the guide-arms, means for revolving the rollers, adjustable plates above the rollers, chutes extending laterally from the same, and conveyers extending forward and converging from the strippers, as and for the purpose shown and set forth.

In testimony that I claim the foregoing as my own I have hereunto affixed my signature in presence of two witnesses.

GRANVILLE G. WESTERFIELD.

Witnesses:
J. K. FESSLER,
J. R. WESTERFIELD.